(12) United States Patent
Kotani et al.

(10) Patent No.: US 9,135,677 B2
(45) Date of Patent: Sep. 15, 2015

(54) APPARATUS WHICH LAYOUT ONE OR MORE IMAGES AND PRODUCE OUTPUT, AND THE METHOD THEREOF

(71) Applicant: CANON KABUSHIKI KAISHA, Tokyo (JP)

(72) Inventors: Takahiro Kotani, Kawasaki (JP); Yousuke Sugai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 13/933,744

(22) Filed: Jul. 2, 2013

(65) Prior Publication Data
US 2014/0010477 A1 Jan. 9, 2014

(30) Foreign Application Priority Data
Jul. 9, 2012 (JP) .................. 2012-153678

(51) Int. Cl.
*G06T 3/40* (2006.01)
*G06T 11/60* (2006.01)
*H04N 1/387* (2006.01)
*H04N 1/393* (2006.01)

(52) U.S. Cl.
CPC . *G06T 3/40* (2013.01); *G06T 11/60* (2013.01); *H04N 1/3875* (2013.01); *H04N 1/3935* (2013.01)

(58) Field of Classification Search
USPC .......................... 382/103, 276, 298
See application file for complete search history.

(56) References Cited

U.S. PATENT DOCUMENTS

2012/0063640 A1* 3/2012 Murasawa .................. 382/103

FOREIGN PATENT DOCUMENTS

JP 2006-24183 A 1/2006

* cited by examiner

*Primary Examiner* — Duy M Dang
(74) *Attorney, Agent, or Firm* — Canon USA, Inc., IP Division

(57) ABSTRACT

An apparatus comprising: a determination unit configured to determine whether an object image satisfies a predetermined standard, if the object image is changed to a standard image size predetermined; a changing unit configured to change the standard image size predetermined, in case that the object image does not satisfy a predetermined standard by the determination unit; a generation unit configure to change the image to the image standard image size predetermined set or the standard image size changed by the standard image size changing unit and to generate the layout image.

19 Claims, 19 Drawing Sheets

FIG. 4A

| | | IMAGE SIZE PATTERN | | | | |
|---|---|---|---|---|---|---|
| | | SIZE 1 | SIZE 2 | SIZE 3 | SIZE 4 | SIZE 5 |
| STANDARD IMAGE SIZE/ PAPER SIZE (RATIO (%)) | WIDTH | 70 | 50 | 40 | 33 | 25 |
| | HEIGHT | 70 | 50 | 40 | 33 | 25 |

FIG. 4B

| | | IMAGE SIZE PATTERN | | | | |
|---|---|---|---|---|---|---|
| | | SIZE 1 | SIZE 2 | SIZE 3 | SIZE 4 | SIZE 5 |
| STANDARD IMAGE SIZE (THE NUMBER OF PIXELS) | WIDTH | 1637 | 1169 | 936 | 772 | 585 |
| | HEIGHT | 1157 | 827 | 662 | 546 | 414 |

FIG. 7
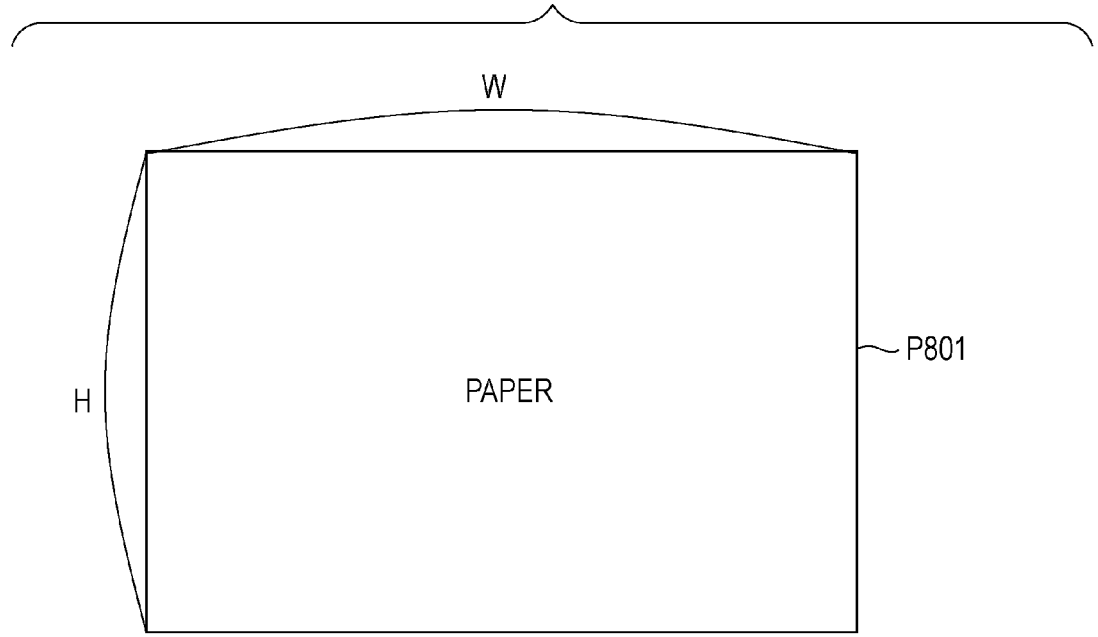
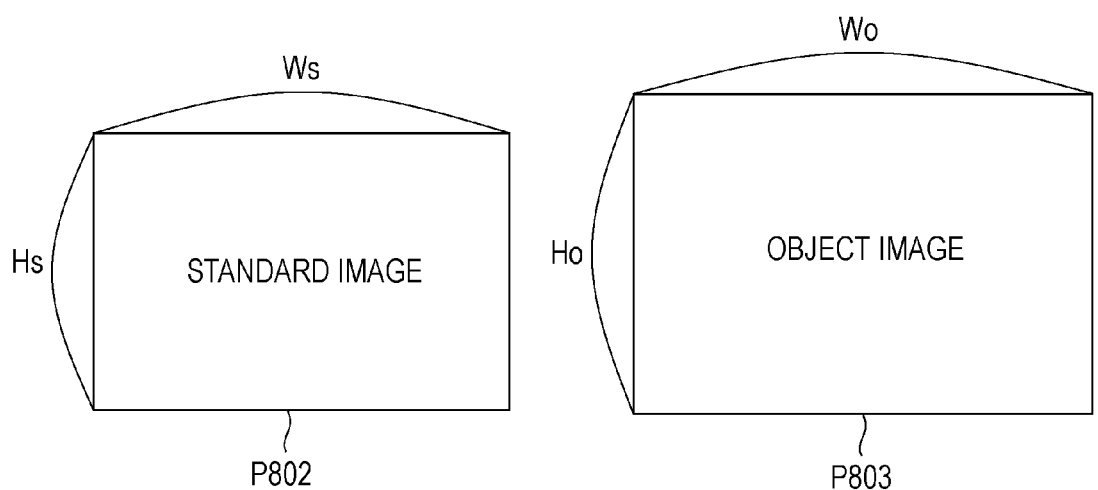

FIG. 15

| NAME OF IMAGE SIZE PATTERN | THE NUMBER OF SHEETS OF ARRANGEMENT ACCORDING TO THE STANDARD IMAGE (THE NUMBER OF PIXELS OF STANDARD IMAGE (WIDTH×HEIGHT)) | | | | |
|---|---|---|---|---|---|
| | SIZE 1 (1637×1157) | SIZE 2 (1169×827) | SIZE 3 (936×662) | SIZE 4 (772×546) | SIZE 5 (585×414) |
| A | | 1 | 1 | 1 | |
| B | | 2 | 1 | | |
| C | | | 3 | | |
| D | | 1 | 2 | | |

FIG. 19

| | | IMAGE SIZE PATTERN | | | | |
| --- | --- | --- | --- | --- | --- | --- |
| | | SIZE 1 | SIZE 2 | SIZE 3 | SIZE 4 | SIZE 5 |
| STANDARD IMAGE SIZE (THE NUMBER OF PIXELS) | WIDTH | 1157 | 827 | 662 | 546 | 414 |
| | HEIGHT | 819 | 585 | 468 | 368 | 293 |

APPARATUS WHICH LAYOUT ONE OR MORE IMAGES AND PRODUCE OUTPUT, AND THE METHOD THEREOF

An apparatus which layout one or more images and produce output, and the method thereof.

BACKGROUND OF THE INVENTION

1. Field of the Invention

The present invention relates to an apparatus, which layouts one or more images and outputs, and the method thereof.

2. Description of the Related Art

In an image layout apparatus, which automatically arranges images, processing is performed by the apparatus to adjust the image size to an appropriate size to fit in the layout (Patent Laid No. JP 2006-24183).

However, in case the apparatus automatically adjusts the image to fit to an appropriate size, there are possibilities deteriorations in the image quality depending on the number of pixels of the image and/or contents of the image may occur.

For example, when the apparatus changes an image with smaller number of pixels to a larger size, there is a possibility the image quality deterioration to become conspicuous.

However, depending on the type of image, there are cases deterioration in the image quality is difficult to recognize visually on a display apparatus such as a display.

There are cases deterioration in the image quality is first recognized on a printed object printed by a printing apparatus such as a printer.

Therefore, there are problems for the user to have to repeat processing in order to prevent deterioration in the image quality on the image or selecting image on the object of layout again, after recognizing results displayed on the display or printed results.

SUMMARY OF THE INVENTION

An aspect of the present invention is to provide an apparatus and a method which solve the problem of the prior art.

Another aspect is to provide an apparatus and a method that can simply and easily output a layout image with restrained deterioration in the image quality.

The present invention is directed to an apparatus comprising: a determination unit configured to determine whether an object image satisfies a predetermined standard, if the object image is changed to a standard image size predetermined set; a changing unit configured to change the standard image size predetermined set, in case that the object image does not satisfy a predetermined standard by the determination unit; a generation unit configure to change the image to the image standard image size predetermined set or the standard image size changed by the standard image size changing unit and to generate the layout image.

Further features of the present invention will become apparent from the following description of exemplary embodiments (with reference to the attached drawings).

BRIEF DESCRIPTION OF THE DRAWINGS

FIGS. 4A and 4B are an example of aspects of standard image sizes for paper size and setting according to the first embodiment.
FIG. 7 is an explanatory diagram of a standard image size and an object image according to the first embodiment.
FIG. 15 is a chart showing the relation between the number of placement image per image size and standard image size, according to the third embodiment.
FIG. 19 is a diagram showing an example of standard image size was reset for adapting to paper size in the fifth embodiment.

DESCRIPTION OF THE EMBODIMENTS

In the following embodiments, it is to be understood that the following embodiments are not intended to limit the claims of the present invention, and that not all of the combinations of the aspects that are described according to the following embodiments are necessarily required with respect to the means to solve the problems according to the present invention.

Embodiment 1

Figure 1:
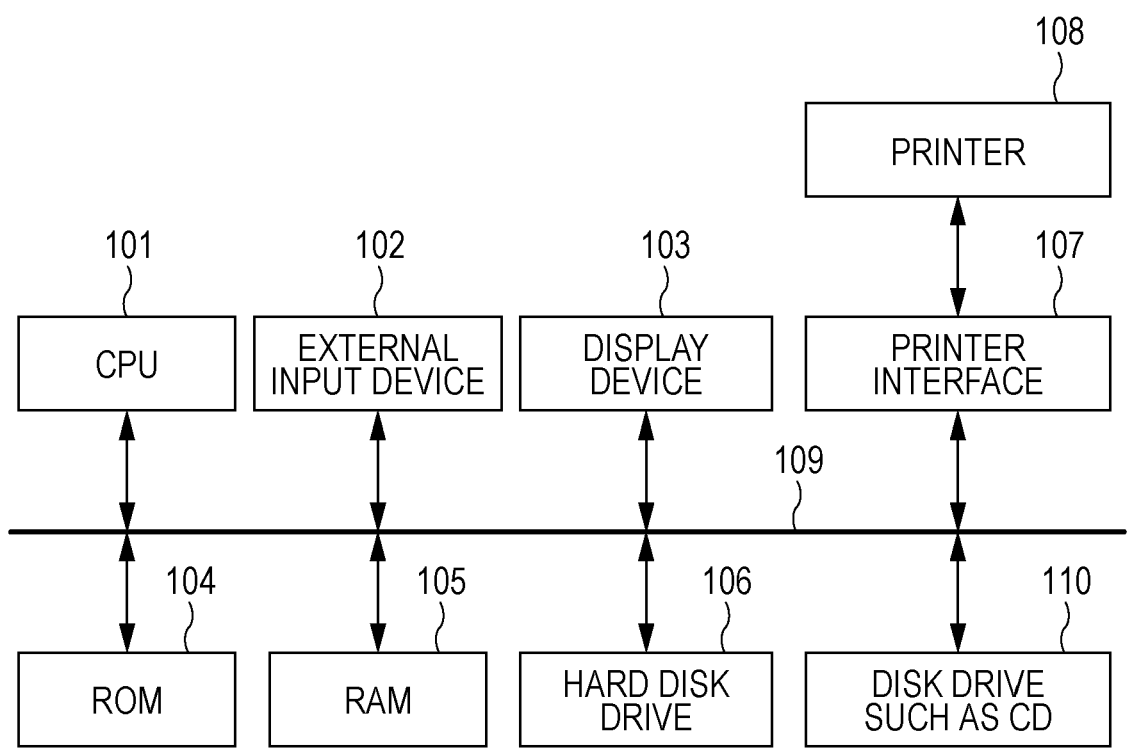
FIG. 1 is a block diagram of an image processing apparatus according to the first embodiment.

FIG. 1 is a block diagram of an image processing apparatus according to the first embodiment. An image processing apparatus has a CPU 101, an external input device 102, a display device 103, a ROM 104, a RAM 105, a hard disk drive 106, and a disk drive 110, is interconnected to them via data bus 109. The image processing apparatus has an interface 107, and is connected to a printer H08 via the interface 107. A control unit (CPU, hereinafter) 101 loads a program stored in a ROM 104 and the like to a RAM 105 and runs the program on the RAM 105, thereby controlling of the entire image processing apparatus according to the present embodiment.

The external input device 102 is for input of various kinds of instructions by the user, such as a keyboard, a mouse, and the like. The display device 103 is the device to display images and various kinds of information.

The ROM 104 is a memory which memorizes control processes which controls the whole image processing apparatus, images, and another necessary information. The RAM 105 is a memory which is used for executing programs and provides work area. The hard disk drive 106 is used for reading and writing various kinds of data and storing programs. The disk drive 110 includes CD-ROM and so on. The hard disk drive 106 and disk drive 110 are generally called external storages, used to store application programs following to the flowchart or a printer driver for controlling the printer 108 in it. This external storage is loaded on RAM 105, is controlled by CPU 101. The image processing apparatus is executed by installing above-mentioned application program and printer driver on a personal computer.

The data bus 109 is used to transmit various kinds of data.

In the present embodiment, in case a user lays out output images to a user selected size, CPU 101 determines whether deterioration in the image quality occurs or not. In case that CPU 101 determines that deterioration in the image quality occurs, it automatically adjusts the size of the image to an appropriate size. In the present embodiment, CPU 101 determines a size of the level of occurrence of a jaggy. Here, the term jaggy is defined as a condition that the level of deterioration in image quality can be recognized visually when output image is enlarged to a certain size, and is a kind of deterioration in the image quality. More specifically, the jaggy is a condition notch shapes of stairs are seen, instead of a smooth straight line and curve. The jaggy tends to occur easier so that the resolution of an object image lowers.

Figure 2:
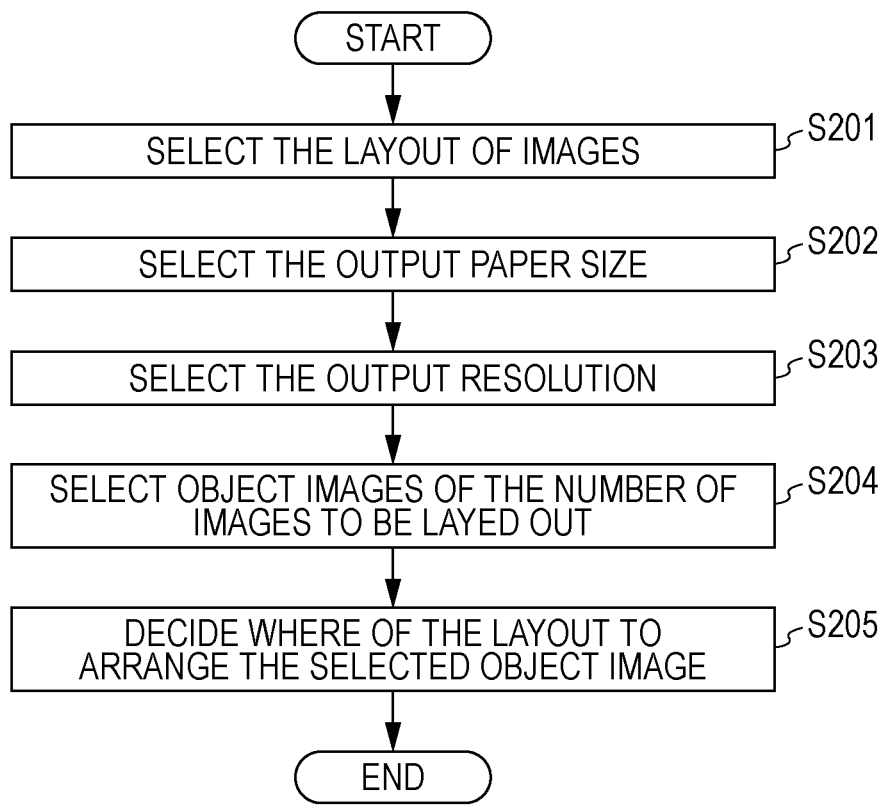
FIG. 2 is a flowchart of an image layout decision process according to the first embodiment.

Here, FIG. 2 to FIG. 9. are used to explain the image processing method in an application program according to the present embodiment. FIG. 2 is a flowchart which is an initial setting in the image processing method. The processing is performed such that a program stored in the ROM 104 and so on is loaded to the RAM 105 to be executed by the CPU 101.

Figure 3:
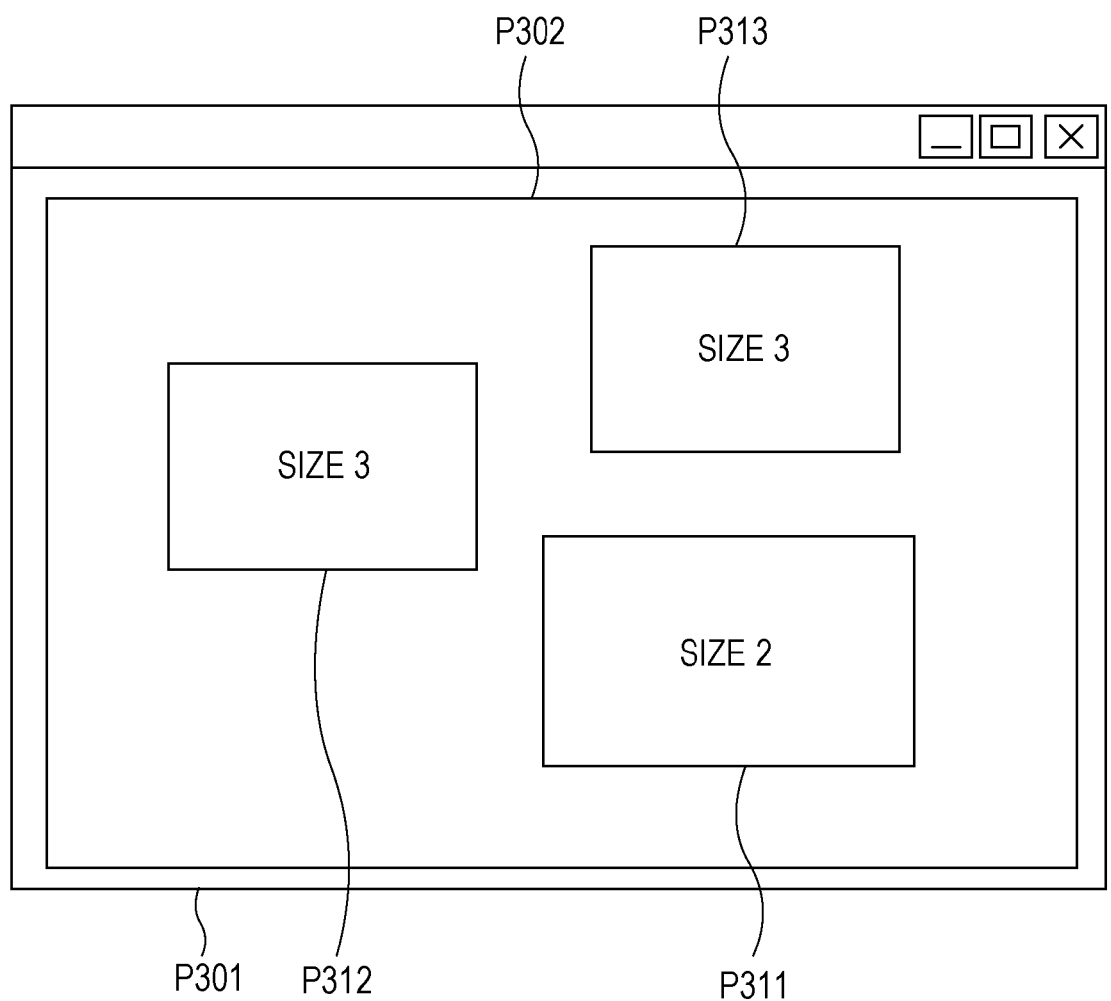
FIG. 3 is an example of layout template according to the first embodiment.

First, in S201, a layout template is decided. In the present embodiment, a user selects one from several templates and it is decided the layout template. Here, the layout template that the user selected is a template of FIG. 3. In FIG. 3, P301 is a display window, P302 is a background image. P311, P312, and P313 each are frames showing positions and size which images are laid out. The predetermined size (mentioned as "standard image size" hereafter) is assigned to each of these frames. This standard image size is a size that deterioration in the image quality is permissible (the jaggy is not outstanding). In FIG. 3, the image size pattern of size 2 is assigned to the frame P311, the image size pattern of size 3 is assigned to the frame P312 and P313. In the present embodiment, each standard image size of image size patterns (size 1 to size 5) is set so that a ratio for paper size is set to a value shown in FIG. 4A.

In FIG. 4A, the standard image size is a size which is reduced in a predetermined ratio while keeping the aspect ratio (the ratio of the length (height) and width) of the paper size. In the present embodiment, each standard image size is set have the same aspect ratio with output paper size. This allows easier process in subsequent steps.

In S202, the CPU 101 decides output paper size when make the printer print layout image. In the present embodiment, a user selects the output paper size and the CPU 101 decides the output paper size, that is the layout image size. The output paper size may be predetermined, in which case S202 is skipped.

In S203, the output resolution of the image data produced by the application program is decided. In the present embodiment, a user selects the output resolution and the output resolution of the image is decided. The output resolution may be set in advance, in which case S203 is skipped. Here, a user selects the resolution of 200 dpi.

In case the paper size is A4 and the output resolution is 200 dpi, image size of 1654 pixels in width and 2339 pixels in length is necessary, taking into account the predetermined margins in the present embodiment, to enable 200 dpi resolution print on a A4 (297 mm×210 mm) paper size. For each standard image size which are applied to each frames, it is apparent that the necessary number of the pixels in length and in width as shown in FIG. 4B, by the number of these pixels which is necessary to print the image and the ratio of a standard image size shown in FIG. 4A for the paper size.

Here, the number of the necessary pixels satisfies the output resolution, but, the image processing apparatus may multiply a coefficient to the number of these necessary pixels, depending on a demanded output standard.

In S204, the image used for a layout is decided. In the present embodiment, for the number of sheets that can arrange images in the layout templates which are selected in S201, a user selects images. In the present embodiment, a user selected the layout shown in FIG. 3, there are three frames of P311 to P313 in the layout (in P302 on display screen). A user selects three images.

Figure 5:
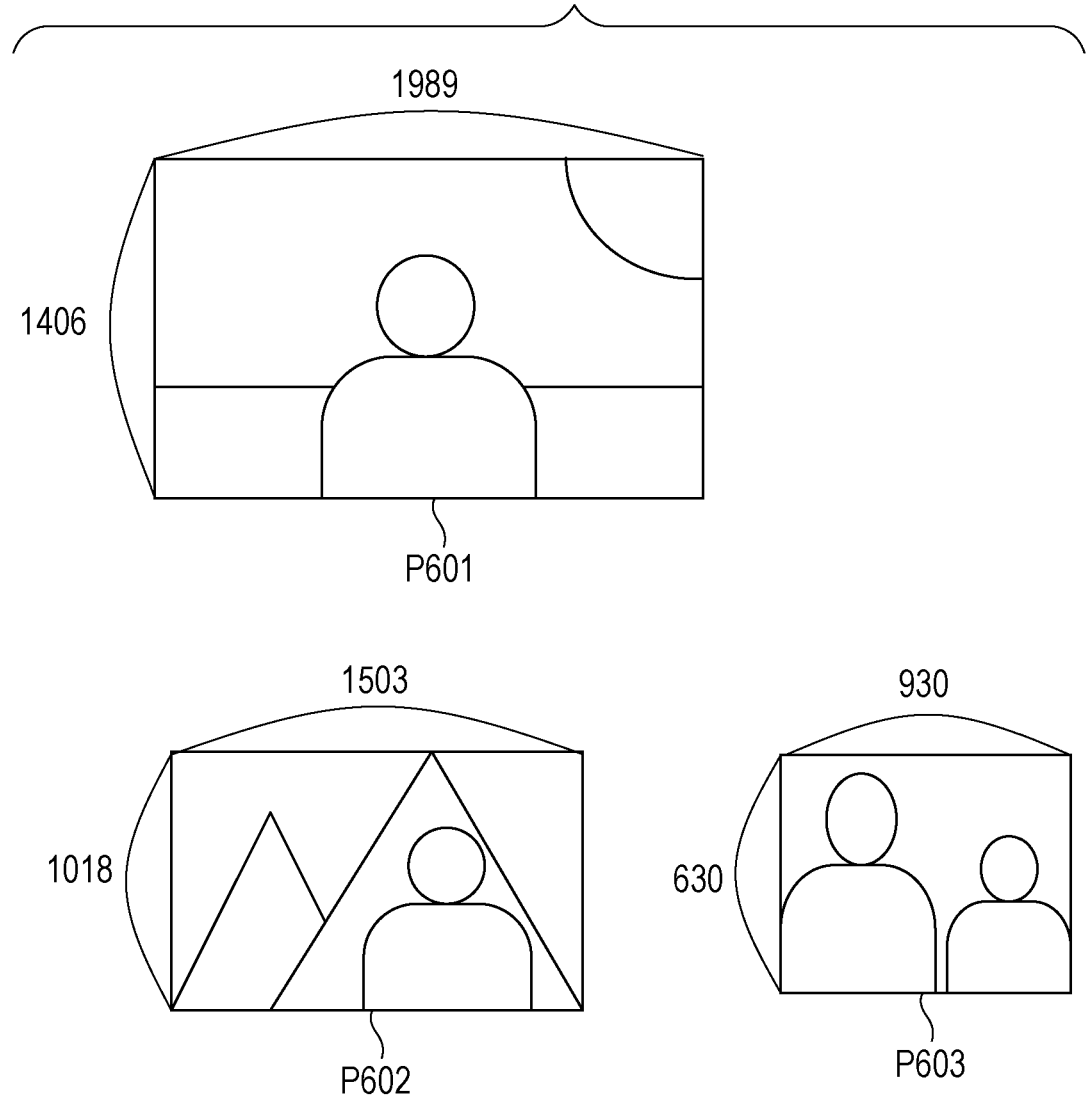
FIG. 5 is an example of an image preparing layout according to the first embodiment.

Here, FIG. 5 shows the image size of the image that a user selects in the present embodiment. Images which are selected in the present embodiment, which are shown in FIG. 5, are the image P601 of 1406 pixels in length×1989 pixels in width, the image P602 of 1018 pixels in length×1503 pixels in width, and the image P603 of 630 pixels in length×930 pixels in width. These are different image sizes.

In S205, positions that the selected images are laid out are decided. In the present embodiment, images selected by a user are assigned to frames P311 to P313 in the layout template (the layout pattern) shown in FIG. 3. That is, how apply each images to the layout template is decided. In the present embodiment, the image processing apparatus applies P601 to P311, P602 to P312, and P603 to P313.

Through above-mentioned S201 to S205, the initial setting that a user sets is completed.

Figure 6:
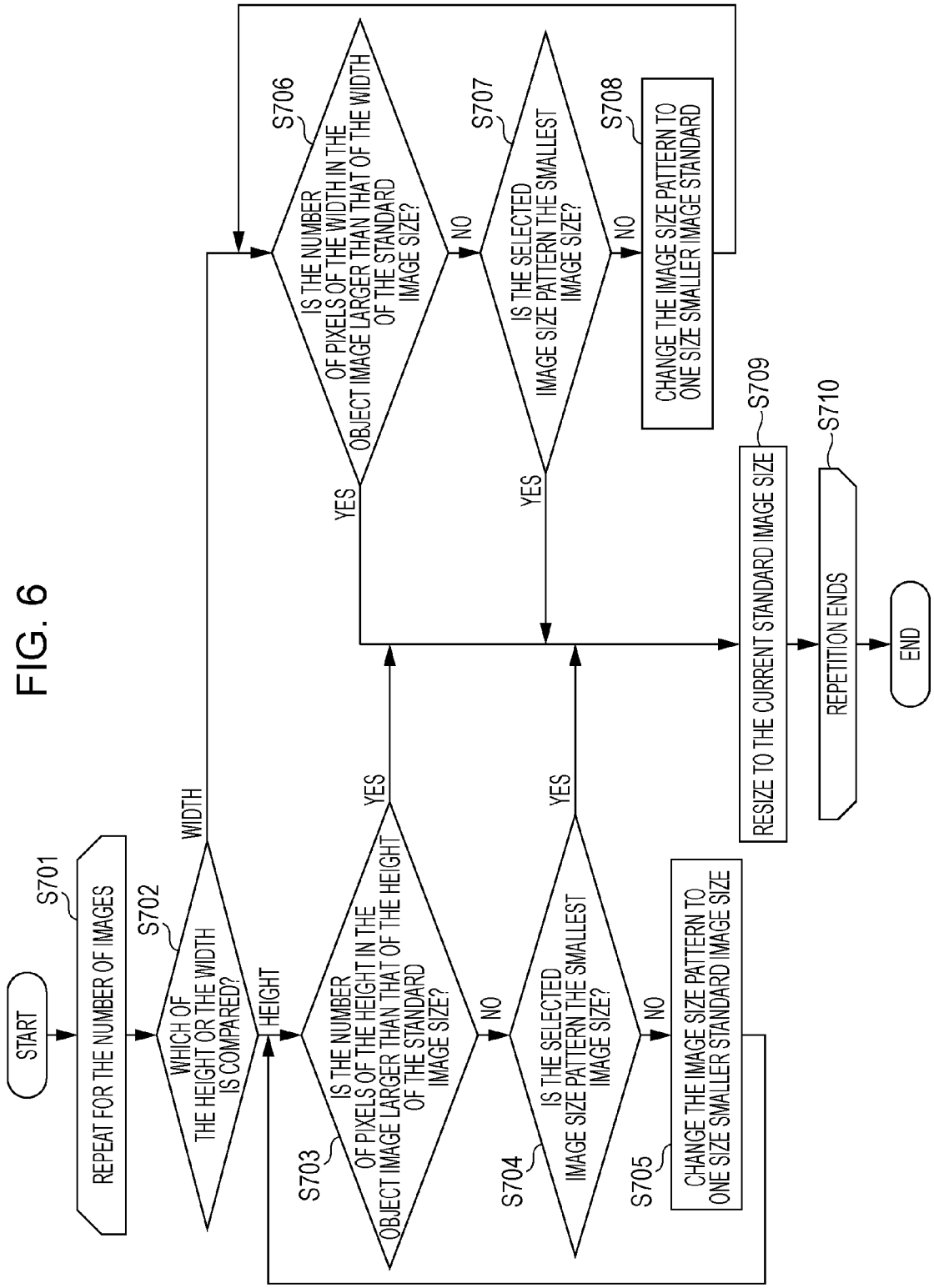
FIG. 6 is a flowchart of an image processing according to the first embodiment.

Here, FIG. 6 is used to explain the image processing after having set initial setting. FIG. 6 is the flowchart that a user has set initial setting. The processing is performed such that a program stored in the ROM 104 and so on is loaded to the RAM 105 to be executed by the CPU 101.

At first, in S702, in comparing the object image size with the standard image size, CPU 101 decides whether to compare widths or lengths. CPU 101 sets the width-to-length ratio in line with the output paper. The width-to-length ratio of the object image does not always match with the width-length ratio of the output paper. Therefore, the CPU 101 selects whether to compare widths of the standard image and the object image or the lengths of them.

Here, in S702, FIG. 7 and FIG. 8 is used to explain the decision method how the image processing apparatus selects either the width or the length as the object of comparison when comparing the object image size with the standard image size. P801 shown in FIG. 7 shows set paper size, W and H each represent the number of pixels in width and the number of pixels in length. P802 represent the standard image size that is set by the place arranging the object image, Ws and Hs each represent the number of pixels in width and the number of pixels in length of the standard image size.

In the present embodiment, the width-to-length ratio of the standard image size is set to match the width-to-length ratio of the paper size. Consequently, the following formula (1) is satisfied.

$$W/H = Ws/Hs \qquad (1)$$

Here, FIG. 8 shows that it is changed which side of the length or the width in comparing the object image is a comparison object depending on the shape of the object image when the standard image size is constant rectangle. In case that the object image is inscribed within the rectangle of the standard image size by enlarging or reducing, a side that is consistent with the side of the rectangle of the standard image size among a length side or a width side of the object image is set as a comparison object. That is, the standard image size is defined for arranging the object images in the layout for the sake of convenience. So there is a case that the standard image size is not consistent with a size of the object image.

In FIG. 8, the object image is inscribed in the rectangle of the standard image size by enlarging, because the object image is smaller than the rectangle of the standard image size. In this case, the smallest homologous figure which restrains the jaggy (or deterioration in the image quality) in the homologous figures with the same width-to-length ratio (the aspect ratio) to the object image is a figure which inscribes in a rectangle of the standard image size.

Figure 8A:
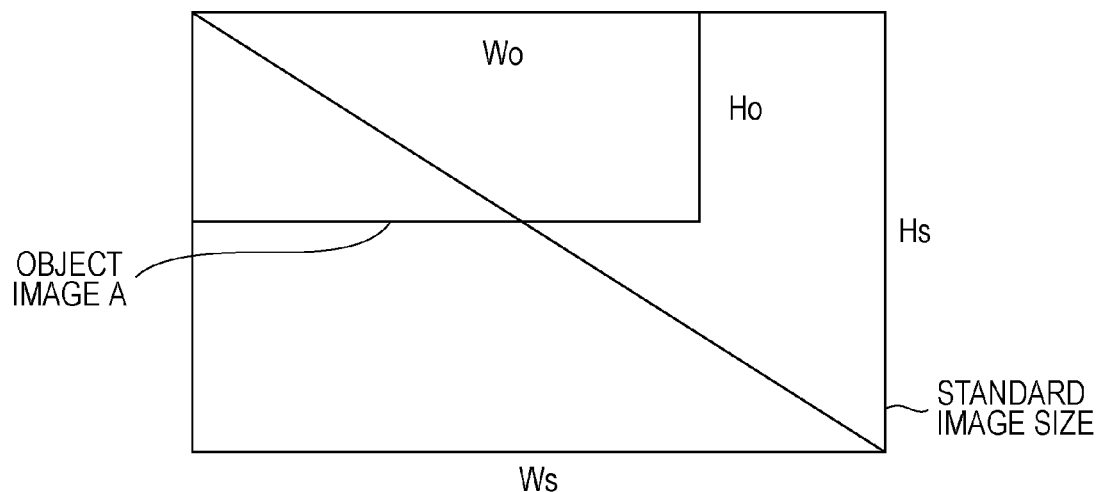
FIGS. 8A and 8B are an explanatory diagram of the decision making method in case the side used for comparing of the object image with the standard image, according to the first embodiment.

In FIG. 8A, in case that ratio of the width and length of the object image is larger than the ratio of the width and length of the standard image as a result of comparing the ratio of the width and the length of the object image and the standard image, that is the following formula (2) is satisfied, side of widths of object image and the standard image (that is Wo and Ws) is compared.

$$Wo/Ho > Ws/Hs \qquad (2)$$

Figure 8B:
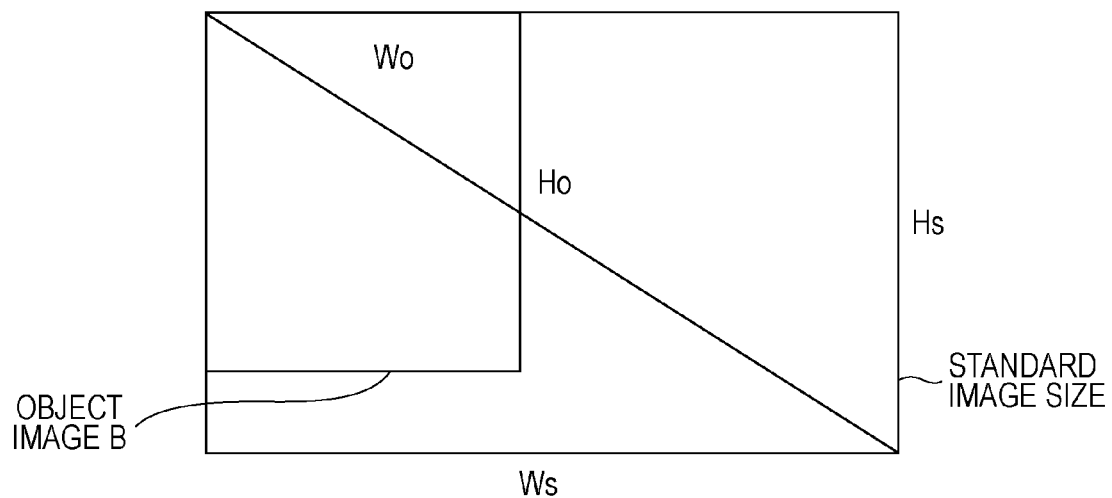

In FIG. 8B, in case that the ratio of the width and length of the object image is smaller than the ratio of the width and the length of the standard image as a result of comparing the ratio of the width and the length of the object image and the standard image, that is the following formula (3) is satisfied, side of lengths of object image and the standard image (that is Wo and Ws) is compared.

$$Wo/Ho < Ws/Hs \qquad (3)$$

In case that as a result comparing the width with the length of the object image and the standard image, the following formula (3) is satisfied, which side of the width or the length of the object image and the standard image may be compared, but in the present embodiment the lengths of object image and the standard image is compared.

$$Wo/Ho = Ws/Hs \qquad (4)$$

CPU 101 decides either the length or the width of each images as a comparison object, when the object image size with the standard image size is compared by the above-mentioned method in S702. If the comparison object is the length of the image, the process proceeds to S703. If the comparison object is the width of the image, the process proceeds to S706.

In S703, CPU 101 determines whether the object image satisfies the predetermined standard or not, in case that the selected object images as setting was set. More specifically, CPU 101 determines whether appropriate output results that the jaggy is hard to occur is provided or not. In the present embodiment, in case that the size of the object image is larger than the standard image size, it is determined that the appropriate output results that jaggy is hard to occur is provided, because the object image is reduced when the object image is arranged. In case that a size of the object image is equal to the standard image size, it is determined that the reasonable output results that the jaggy is hard to occur, because the object is not need to be resized when the object image is arranged.

On the other hand, in case that a size of the object image is smaller than the standard image size, it is determined that there is a possibility that the jaggy occurs and the appropriate output results is not provided, because the object image is enlarged when the object image is arranged. In other words, in the present embodiment, in S703, CPU 101 determines whether the number of the pixels of the length in the object image is larger than or equal to the number of the pixels of the length in the standard image size or not. And, in case that it is determined that the number of the pixels of the length in the object image is larger than or equal to the number of the pixels of the length in the standard image size, the process proceeds to S709, the object image is resized to the present set standard image size. On the other hand, in case that it is determined that the number of the pixels of the length in the object image is smaller than the number of the pixels of the length in the standard image size, the process proceeds to S704.

In S704, CPU 101 determines whether the present set standard image size is smallest among the image size patterns or not. If the present set standard image size is not the smallest, the process proceeds to S705. On the other hand, if the present set standard image size is smallest, the process proceeds to S709, the object image is resized as follows. Here, when the present set standard image size is already smallest among the image size patterns, the image processing apparatus may notify the user of the jaggy may occur.

In S705, CPU 101 causes to change the standard image size to a smaller size in the image size patterns. That is, the image processing apparatus changes the set standard image size. After S705, the process goes back to S703.

On the other hand, in S706, CPU 101 determines whether the object image satisfies the predetermined standard or not, in case that the selected object images are arranged as setting is being set as well as S703. More specifically, CPU 101 determines whether the appropriate output results that the jaggy is hard to occur is obtained or not. In the present embodiment, in case that a size of the object image is larger than the standard image size, it is determined that the output results that the jaggy is hard to occur is obtained, because the object image is reduced when the object image is arranged. And In case that a size of the object image is equal to the standard image size, it is determined that the output results that the jaggy is hard to occur is obtained, because the object image is not need to resize when the object image is arranged.

On the other hand, in case that a size of the object image is smaller than the standard image size, it is determined that there is a possibility the jaggy occurs and the appropriate output results is not provided, because the object image is enlarged when the object image is arranged. In other words, in the present embodiment, in S706, it is determined whether the number of the pixels of the width in the object image is larger than or equal to the number of the pixels of the width in the standard image size or not. In case that it is determined that the number of the pixels of the width in the object image is larger than or equal to the number of the pixels of the width in the standard image size, the process proceeds to S709, CPU 101 causes to resize the object image to the present set standard image size. On the other hand, in case that it is determined that the number of the pixels of the width in the object image is smaller than the number of the pixels of the width in the standard image size, the process proceeds to S707.

In S707, CPU 101 determines whether the present set standard image size is smallest among the image size patterns or not, same as S704. If the present set standard image size is not the smallest, the process proceeds to S708. On the other hand, if the present set standard image size is the smallest, the process proceeds to S709, the image processing apparatus resizes as follows. Here, when the present set standard image size is already smallest among the image size patterns, the image processing apparatus may notify the user of the jaggy may occur.

In S708, CPU 101 causes to change the standard image size to a smaller size in the image size patterns, same as S705. That is, the set standard image size is changed. After S708, the process goes back to S706.

In S709, CPU 101 causes to resize the object image to the present set standard image size. More specifically, in case that the process proceeds from S703 to S709, the object image is reduced. In this case, the object image is resized so that the number of the pixels of the length in the object image is equal to the number of the pixels of the length in the standard image size. However, in S703, in case that it is determined the object image is equal to the standard image size, the object image is not resized.

In case that the process proceeds from S704 to S709, enlargement of the object image is performed. On the other hand, In case that the process proceeds from S706 to S709, In this case, the object image is resized so that the number of the pixels of the width in the object image is equal to the number of the pixels of the width in the standard image size. However, in S706, in case that it is determined the object image is equal to the standard image size, the object image is not resized. On the other hand, the process proceeds from S707 to S709, enlargement of the object image is performed.

The image processing apparatus resizes each image by performing above-mentioned steps from S701 to S709 for each object image, then the process proceeds to S710 to complete the processing.

Specific description of the above-mentioned image processing is given, with the example of the object image P603 of FIG. 5 arranged in a frame P313 of FIG. 3.

The standard image size is 936 pixels in width and 662 pixels in length, because the frame P313 is size 3. (refer to FIG. 4B) In contrast, the object image P603 is 930 pixels in width and 630 pixels in length as shown in FIG. 5.

$$Wo/Ho(930/630) > Ws/Hs(936/662)$$

The above formula (2) is satisfied, so in S702, CPU 101 decides to compare the length (number of pixels) between the width and length of the object image and the standard image size. So the process proceeds to S706.

In S706, it is determined that the number of the pixels of the width in the object image (Wo: 930 pixels) is smaller than the number of the pixels of the width in the standard image size (Ws: 936 pixels), the process proceeds to S707. In S707, it is determined whether the standard image size pattern is smallest or not. The selected standard image size pattern for the object image is pattern 3 and is not smallest. So the image processing apparatus proceeds to S708 and the standard image size is changed to pattern 4, a smaller size.

The process goes back to S706, it compares the width of the object image P603 with the width of the standard image size of pattern 4. In S706, it is determined that the number of pixels of the width in the object image (Wo: 930 pixels) is larger than the number of the pixels of the width in the standard image size (Ws: 772 pixels), the process proceeds to S709.

In S709, the object image P603 is resized to the standard image size of pattern 4. At this step, the object image is resized so that the number of the pixels of the width in the object image is equal to the number of the pixels of the width of the standard image size and the original width-to-length ratio (the aspect ratio) is not changed. By this result, the image P603 is changed to an image having 936 pixels in width and 662 pixels in length.

Figure 9:
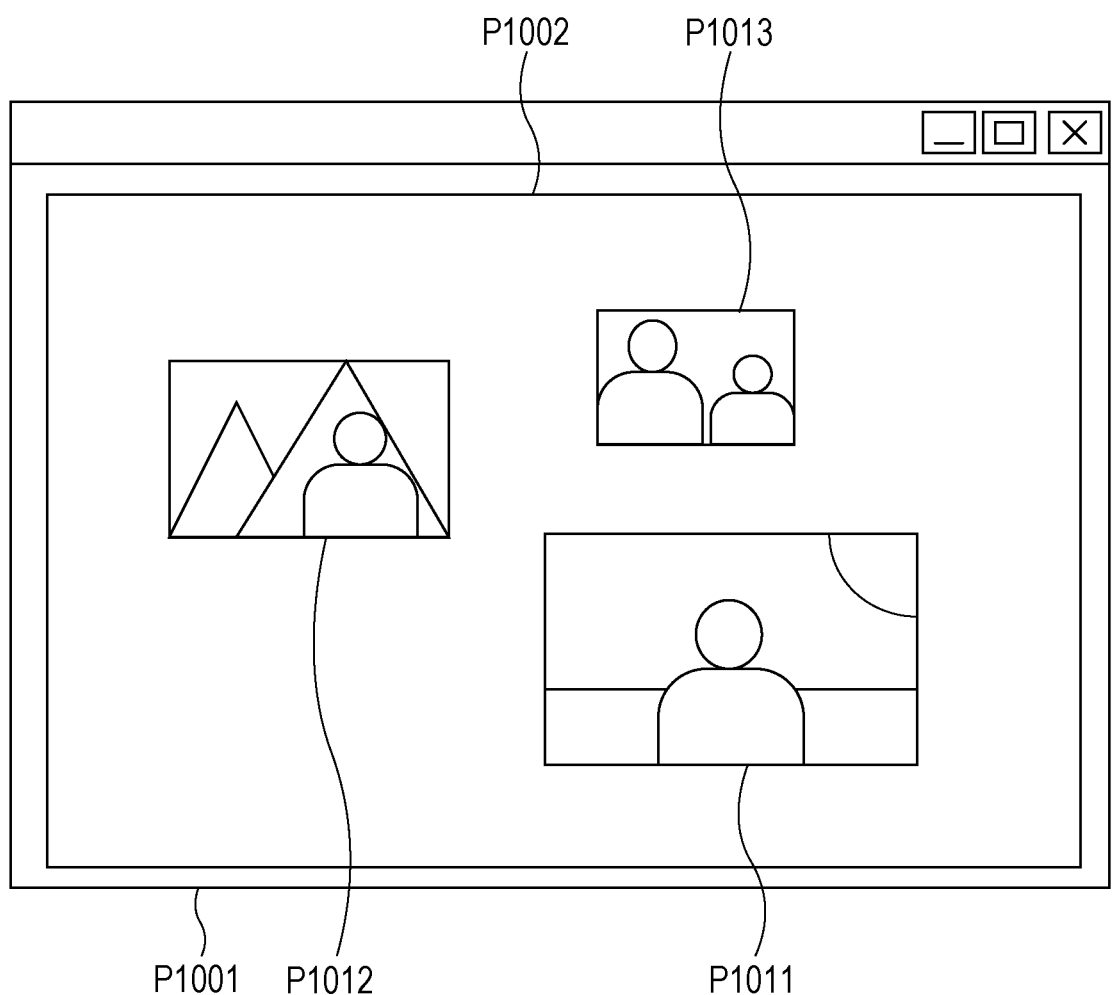
FIG. 9 is one example of output results according to the first embodiment.

By the above-mentioned method, a layout image as shown in FIG. 9 is able to be generated, by adapting the image P602 to the frame P312 and adapting the image P603 to the frame P313.

In the present embodiment, the layout image which restrains generation of jaggy can be generated and output, without changing the image that a user selected, by changing the standard image size when one of more images is layout. Choice of images as an output result becomes wider because the standard image size is able to be changed, various kinds of layout images can be generated and output.

Embodiment 2

Figure 11:
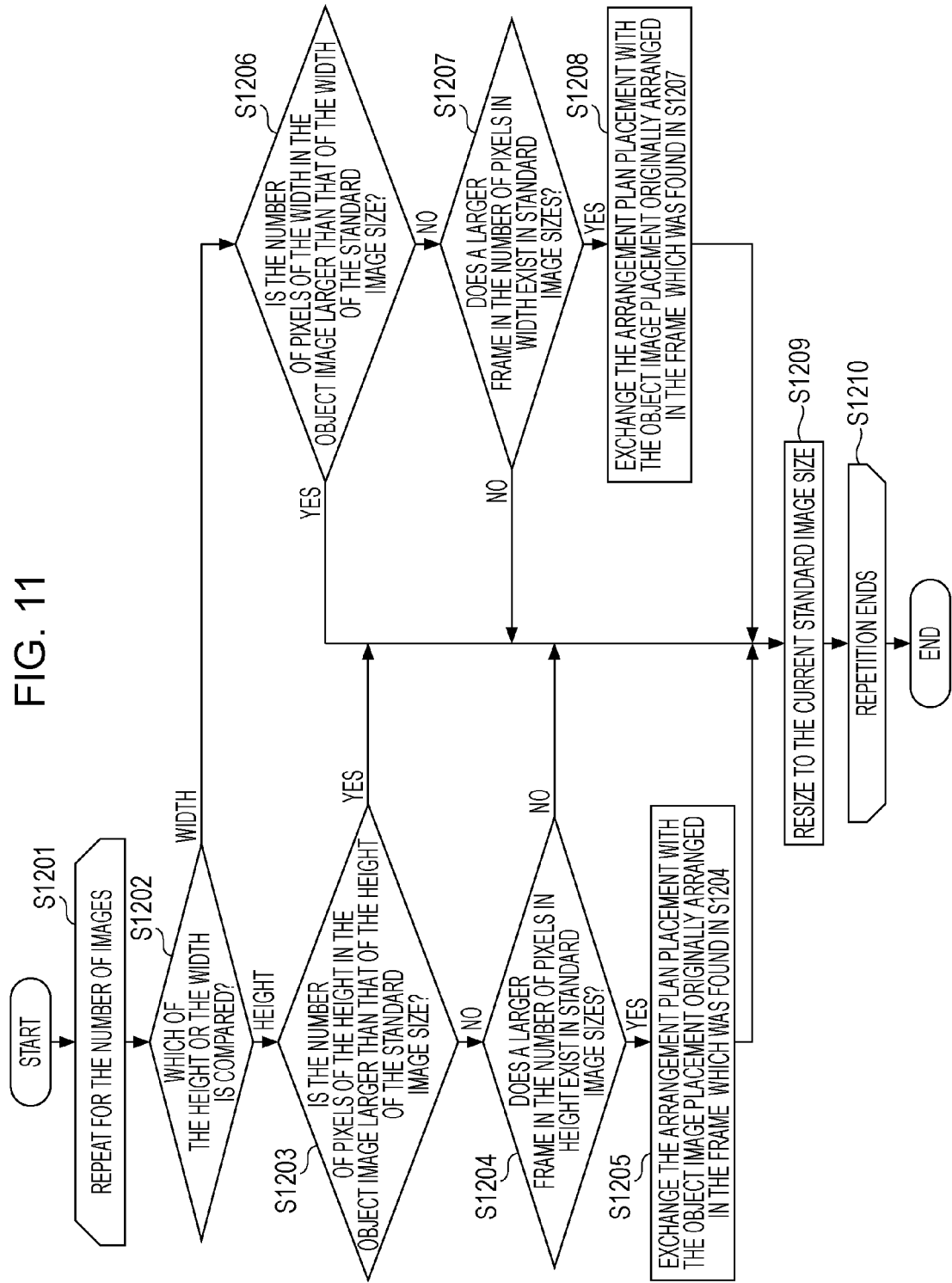
FIG. 11 is a flowchart of an image layout processing according to the second embodiment.

In the present embodiment, the structure of the image processing apparatus and the flowchart of the initial setting in the image processing method is the same as the first embodiment, so the explanation thereof is omitted. FIG. 11 is used to explain the image processing method according to the present embodiment. FIG. 11 is a flowchart of the image processing after having set initial setting by a user. The processing is performed such that a program stored in the ROM 104 and so on is loaded to the RAM 105 to be executed by the CPU 101.

At first, in S1202, CPU 101 decides which of the width or the length in comparing as the object of comparison, when the standard image size with the object image size is compared. An explanation of this decision method is omitted, because this method is the same as the method which is explained by using FIG. 7 in the first embodiment. In S1202, in case that it is decided to compare the length, the process proceeds to S1203. In case that it is decided to compare the width, the process proceeds to S1206.

In S1203, CPU 101 determines whether the object image satisfies the predetermined standard or not, in case that the selected object images are arranged as setting was set. More specifically, CPU 101 determines whether the appropriate output results that jaggy is hard to occur is obtained. In the present embodiment, in case that a size of the object image is larger than the standard image size, it is determined that the output results to an image free of jaggy, because the object image is reduced when the object image is arranged, same as S703. In case that a size of the object image is equal to the standard image size, it is determined that the output results to an image free of jaggy, because the object image is not resized when the object image is arranged. That is, CPU 101 determines whether the number of the pixels of the length in the object image is larger than or equal to the number of the pixels of the length in the standard image size or not.

In case that it is determined that the number of the pixels of the length in the object image is larger than or equal to the number of the pixels of the length in the standard image size, the process proceeds to S1209, the object image is resized to the present set standard image size. On the other hand, in case that it is determined that the number of the pixels of the length in the object image is smaller than the number of the pixels of the length in the standard image size, the process proceeds to S1204.

In S1204, CPU 101 searches whether a template that the number of pixels of length in the object image is larger than the number of pixels of length in the standard image size exists or not, among selected design templates. In other words, CPU 101 decides whether a frame which number of pixels of length of the standard image size is smaller than the number of pixels of length in the object image exists or not. In case that a frame which number of pixels of length of the standard image size is smaller than the number of pixels of length in the object image is set exists, the process proceeds to S1205. In contrast, if such frame does not exist, the process proceeds to S1209.

In S1205, CPU 101 causes to exchange arrangement plan placement of the object image which is set in the frame found by searching in S1204 with the object image of the present judgment processing, the process proceeds to S1209. That is, CPU 101 exchanges the object image which is set in the frame which number of pixels of length of the standard image size is smaller than the number of pixels of length for the object image of the present judgment processing. In S1209, the object image is resized so that the number of pixels of length matches the number of pixels of length in the frame after exchanging.

On the other hand, in S1206, CPU 101 determines whether the object image satisfies the predetermined standard or not as well as S1203, in case that the selected object images are arranged as the setting was set. More specifically, CPU 101 determines whether the output produces image that the jaggy is hard to occur is obtained. In the present embodiment, in case that a size of the object image is larger than the standard image size, it is determined that the output produces image that the jaggy is hard to occur is obtained, because the object image is reduced when the object image is arranged. In case that a size of the object image is equal to the standard image size, it is determined that the output produces image that the jaggy is hard to occur is obtained, because the object image is not need to be resized when the object image is arranged.

On the other hand, in case that a size of the object image is smaller than the standard image size, it is determined that there is a possibility that the jaggy occurs and the appropriate output results is not provided, because the object image is enlarged when the object image is arranged. That is, it is determined whether the number of the pixels of the width in the object image is larger than or equal to the number of the pixels of the width in the standard image size or not. And, in case that it is determined that the number of the pixels of the width in the object image is larger than or equal to the number of the pixels of the width in the standard image size, the process proceeds to S1209, the object image is resized to the present set standard image size. On the other hand, in case that it is determined that the number of the pixels of the width in the object image is smaller than the number of the pixels of the width in the standard image size, the process proceeds to S1207.

In S1207, CPU 101 searches whether a template that the number of pixels of width in the object image is larger than the number of pixels of width in the standard image size exists or not, among selected design templates. In other words, CPU 101 decides whether a frame which number of pixels of width of the standard image size is smaller than the number of pixels of width in the object image exists or not. In case that a frame which number of pixels of width of the standard image size is smaller than the number of pixels of width in the object image exists, the process proceeds to S1208. In contrast, if the frame does not exist, the process proceeds to S1209.

In S1208, CPU 101 exchanges arrangement plan placement of the object image which is set in the frame found by searching in S1207 with the object image of the present judgment processing, the process proceeds to S1209. That is, CPU 101 causes to exchange the object image which is set in the frame which number of pixels of width of the standard image size is smaller than the number of pixels of width for the object image of the present judgment processing. In S1209, the object image is resized so that the number of pixels of length-width matches the number of pixels of width in the frame after exchanging.

In S1209, CPU 101 causes to resize the object image to the present set standard image size. More specifically, in case that the process proceeds from S1203 to S1209, CPU 101 causes to reduce the object image. In this case, the object image is resized so that the number of pixels of the length in the object image is equal to the number of pixels of the length in the standard image size. However, in S1203, in case that it is determined the object image size is equal to the standard image size, the object image is not resized. And, in case that the process proceeds from S1204 to S1209, enlargement of the object image is performed.

On the other hand, in case that the process proceeds from S1206 to S1209, CPU 101 causes to reduce the object image. In this case, CPU 101 causes to resize the object image so that the number of the pixels of the width in the object image is equal to the number of the pixels of the width in the standard image size. However, in S1206, in case that it is determined the object image size is equal to the standard image size, the object image is not resized. On the other hand, the process proceeds from S1207 to S1209, enlargement of the object image is performed.

CPU 101 causes to resize each image by performing above-mentioned steps from S1201 to S1209 to every object image, then process proceeds to S1210 to complete the processing.

Figure 10:
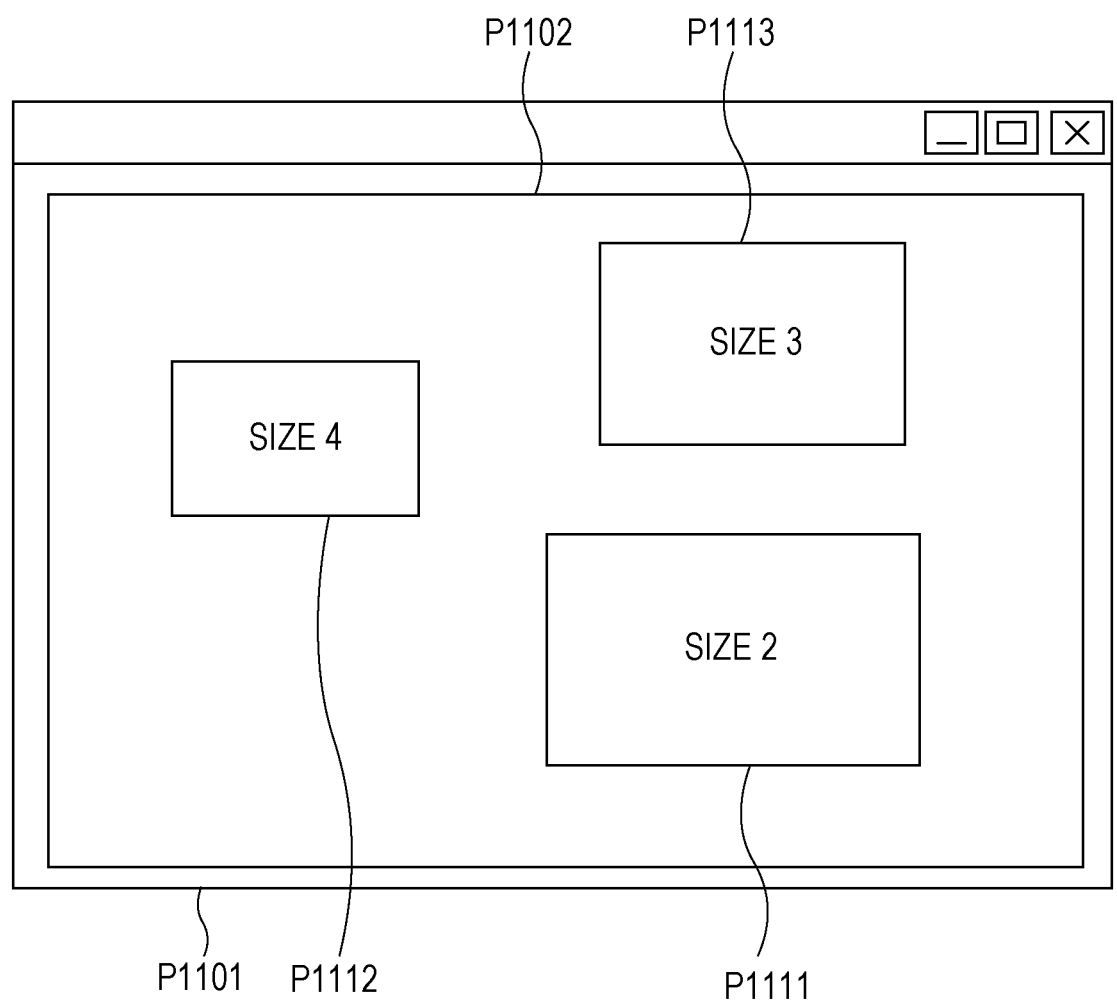
FIG. 10 is a diagram showing a layout template according to the second embodiment.

Specific description of the above-mentioned image processing is given, with the example of the layout template selected, which is shown as FIG. 10 in S1201. In this example, the object image P601 of FIG. 5 is arranged to frame P1111, the object image P602 is arranged to frame P1112, the object image P603 is arranged to frame P1113 of FIG. 10.

In S1202, CPU 101 decides the width length of object image and standard image size to compare among the width and the length of object image and standard image size, same as the method of S702. Therefore the process proceeds to S1206, the number of pixels of width in the frame 1113 with the number of pixels of width in the object image S603 is compared.

Here, $Wo(930) < Ws(936)$

It is determined that the number of pixels of width in the object image S603 is smaller than the number of pixels of width in the frame P1113. Therefore the process proceeds to S1207.

In S1207, CPU 101 determines whether a standard image size with smaller number of pixel in width exists compared to the number of pixels in width of the object image. Here, in comparison to the number of pixels in width in the object image P603 with the number of pixels of width in the frame P1112, the number of pixels in width in the object image P603 (Ho:930) is larger than the number of pixels of width in the frame P1112 (Hs:772). That is, the standard image size with number of pixel in width being smaller than the number of pixels in width in the object image exists, so the process proceeds to S1208.

In S1208, CPU 101 causes to arrange the object image in the frame P1112, the object image P602 which was once planned to fit in frame P1112 is arranged to frame P1113 instead of P603.

Figure 12:
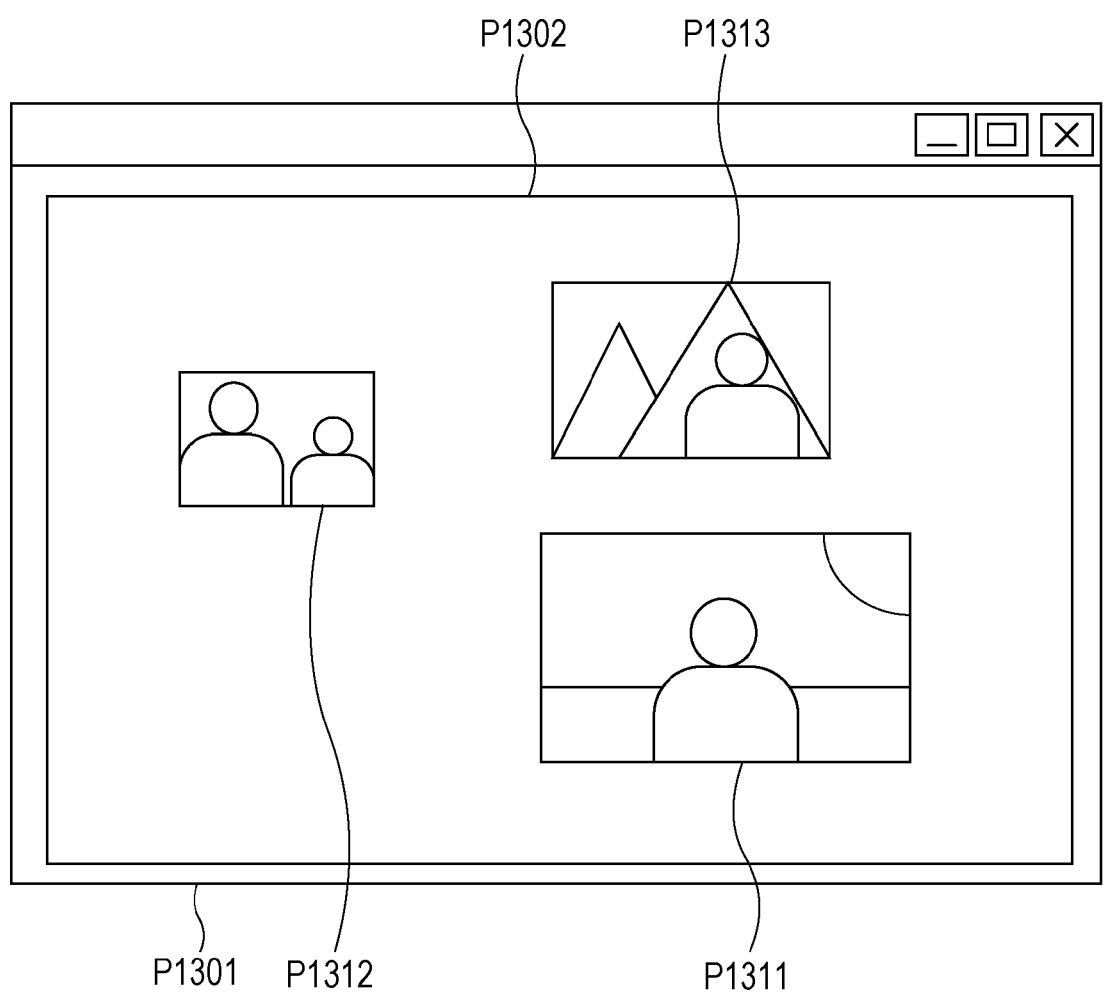
FIG. 12 is one example of output results according to the second embodiment.

Afterwards, in S1209, CPU 101 causes to resize the object image P603 so that the number of pixels of width in the frame P1112 becomes equal to the number of pixels of width in the object image P603. CPU 101 causes to resize the object image to an image having 772 pixels in width and 523 pixels in length without changing the original width-to-length ratio (the aspect ratio). By the above-mentioned method, the image processing apparatus performs a similar processing from the object image P601 to the object image P603, the output image shown in FIG. 12 is provided.

In the present embodiment, when multiple images are arranged in the decided template and a layout image is output, in case that there is an image which may generate deterioration in the image quality, CPU 101 performs the processing that move the image to other appropriate frame set in the template. By this method, the image processing apparatus can generate and output a layout image which restrains generation of jaggy without changing the image that a user selected, by changing a standard image size. Choice of images as an output result becomes wider, the image processing apparatus can generate and output various kinds of layout images.

Embodiment 3

Figure 13:
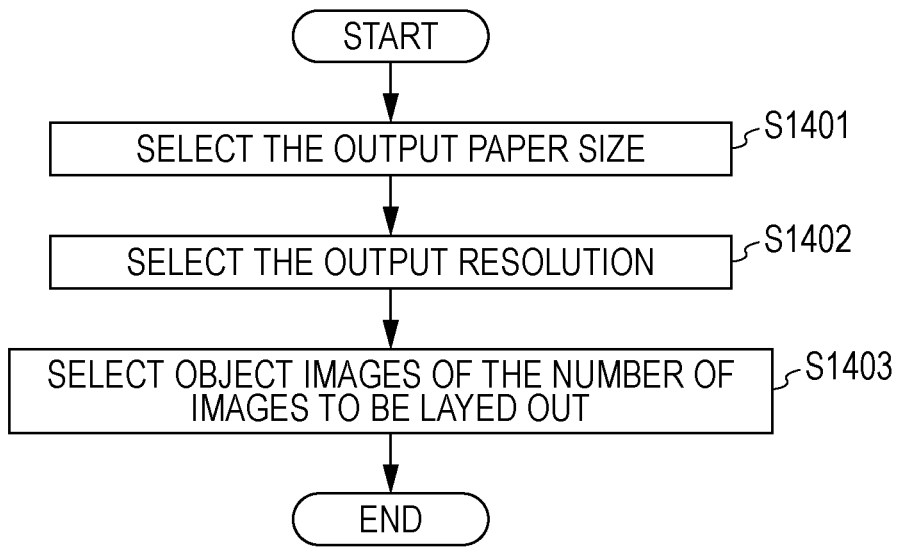
FIG. 13 is a flowchart of an image layout processing according to the second embodiment.

In the present embodiment, the structure of the image processing apparatus is the same as the first embodiment, so the explanation thereof is omitted. FIG. 13 is used to explain the image processing method according to the present embodiment. FIG. 13 is a flowchart of an initial setting in the image processing method. The processing is performed such that a program stored in the ROM 104 and so on is loaded to the RAM 105 to be executed by the CPU 101.

In S1401, CPU 101 decides output paper size. In the present embodiment, CPU 101 decides the output paper size based on a selection made by a user. At first, in S1401, a user selects the output paper size. In this example, the user selects size of A4.

In S1402, CPU 101 decides output resolution. In the present embodiment, CPU 101 decides the output resolution based on a selection made by a user. But the output resolution may be set in advance, in case that the output resolution is set in advance, S1402 is skipped. In this example, a user selects resolution of 200 dpi.

Figure 14:
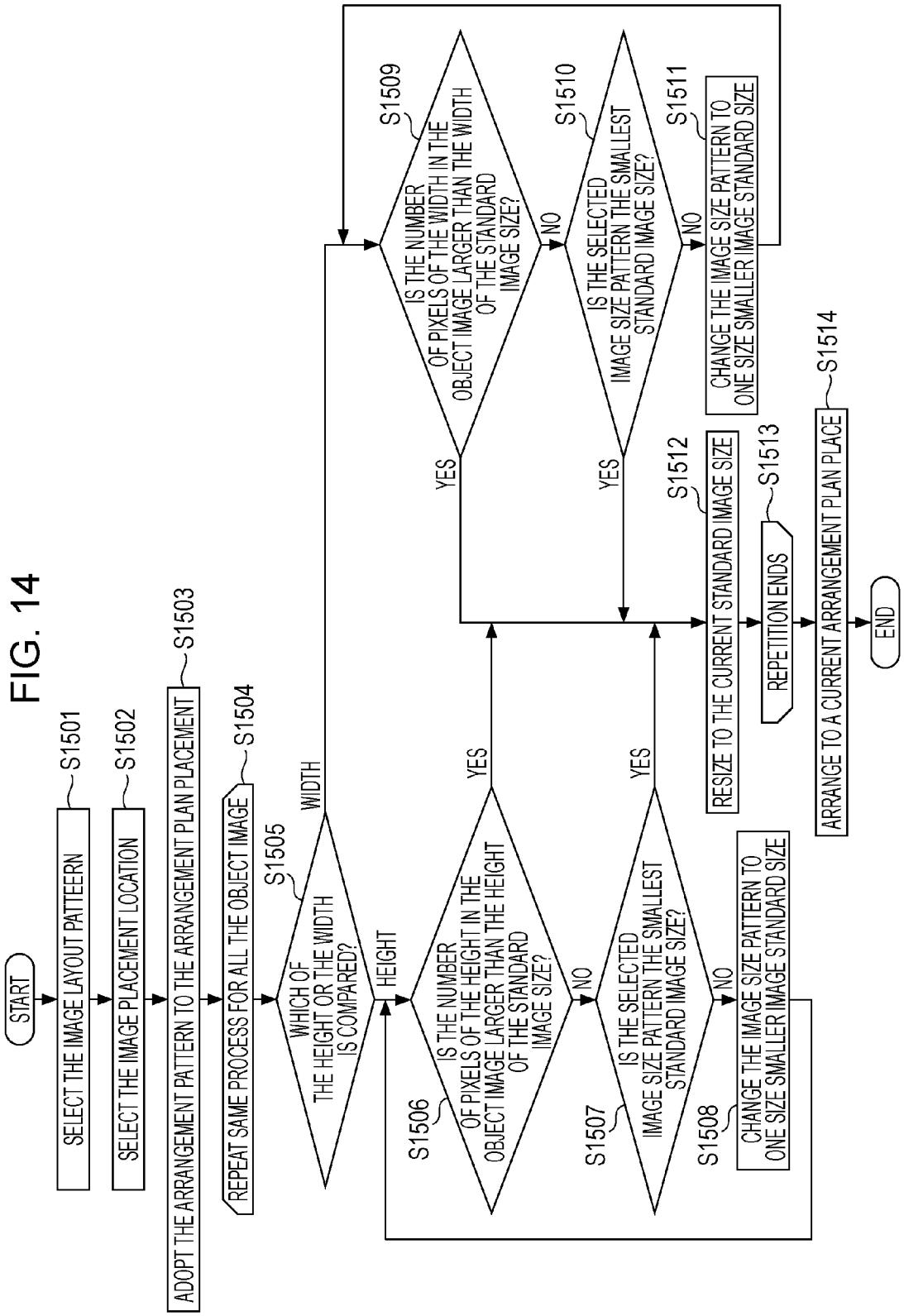
FIG. 14 is a flowchart of an image layout processing according to the third embodiment.

In S1403, CPU 101 decides images which are using in a layout. In this example, a user selects the images which a user wants to lay them out for necessary number of images. Here, it is supposed that a user selects three images of image P601, image P602 and image P603, as shown on FIG. 5. This completes the operation that a user needs to perform. FIG. 14 is used to explain the flow of the image processing steps performed by the image processing apparatus, according to the present embodiment following the initial setting made by a user.

Figure 16:
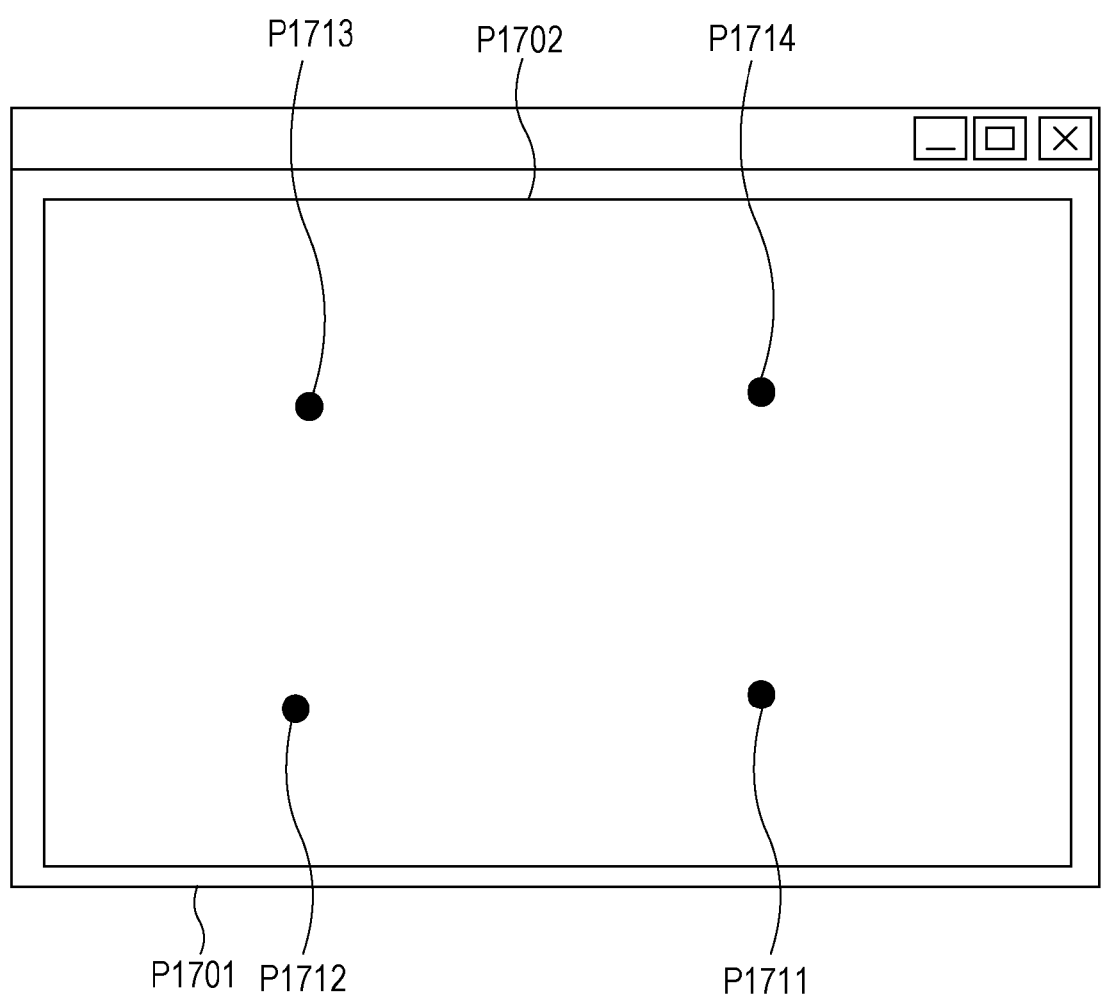
FIG. 16 is an explanatory diagram of image layout method according to the third embodiment.

First, in S1501, the image processing apparatus decides an arrangement pattern of the images. In this embodiment, an arrangement pattern of images is a pattern showing sizes of images which is being arranged. More than one arrangement patterns are provided according to the number of images that the image processing apparatus arranges. In the present embodiment, with the example that has three images, it is supposed that the image size patterns shown in FIG. 16 are provided. Therefore the image processing apparatus is free to select one pattern among the arrangement patterns shown in FIG. 16.

In this example, pattern D is selected. In the table of image size pattern shown in FIG. 16, image sizes of width-to-length according to each image is set by the method same as FIG. 4A of the first embodiment. That is, the image size is set based on the paper size and the output resolution that a user sets and the ratio of each standard image size for paper size that is shown in FIG. 4A.

In S1502, CPU 101 decides places that images are arranged in the layout template. In the present embodiment, each frame of the layout template has image arrangement plan points. The image processing apparatus decides places that images are arranged in the layout template, by selecting a point among the image arrangement plan points for each image.

In the present embodiment, the template shown in FIG. 16 is set as the layout template. In FIG. 16, P1701 is a window for displaying, P1702 is a background image, and P1711 to P1714 are the image arrangement plan points. That is, in FIG. 16, four points are set as potions that images are arranged in advance.

In the present embodiment, CPU 101 plans to lay three images out, so the three points is selected among the image arrangement plan points. In this example, the image processing apparatus selects three points of the image arrangement plan points P1711, P1713 and P1714. And the image processing apparatus sets the image P601 in the image arrangement plan points P1711, sets the image P603 in the image arrangement plan points P1713, and sets the image P602 in the image arrangement plan points P1714.

In S1503, CPU 101 causes to adopt the arrangement pattern to the arrangement plan placement. In the present embodiment, the image processing apparatus sets appropriate image sizes to each image arrangement plan point in FIG. 16. In the pattern D of the image size pattern, which is selected in S1501, there are one size 2 and two size 3. In this example, the image processing apparatus sets that the image arrangement plan placement P1711 is adopted to the size 2, the image arrangement plan placement P1714 is adopted to the size 3.

From this point forward, the explanation from S1504 to S1513 is omitted, because the explanation from S1504 to S1513 is similar to the explanation from S701 to S710 in FIG. 6 of the first embodiment. In S1514, CPU 101 causes to arrange each image which is resized to the arrangement plan placements. The result of this layout is shown on FIG. 9. In this embodiment, the output result is same as the layout template of the first embodiment, as the system processes from S1501 to S1503 of the present embodiment is the same, and the initial setting by a user is same as the first embodiment. Therefore the output image of the first embodiment and the third embodiment are the same.

In the present embodiment, the image arrangement points which are for arranging images are set in the layout template. The system adopts the selected image to this image arrangement point, and decides automatically a size of image and performs process to arrange images.

By this method, the image processing apparatus can generate and output the layout image which restrains generation of the jaggy without changing the image that a user selected, Choice of images as an output result becomes wider, various kinds of the layout images is generated and output.

In the present embodiment, the frame is not set in the template, but the image arrangement point is set. So a constant turning angle may be added to each image at random when arranging the image. The image processing apparatus give the layout results more varieties by adding turning angle and arranging.

Embodiment 4

In the present embodiment, the structure of the image processing apparatus and the flowchart of the initial setting in the image processing method is the same as the first embodiment, so the explanation thereof is omitted. However, in the present embodiment, it is supposed that a user selects a template shown in FIG. 17A. The processing is performed such that a program stored in the ROM 104 and so on is loaded to the RAM 105 to be executed by the CPU 101.

Figure 17A:
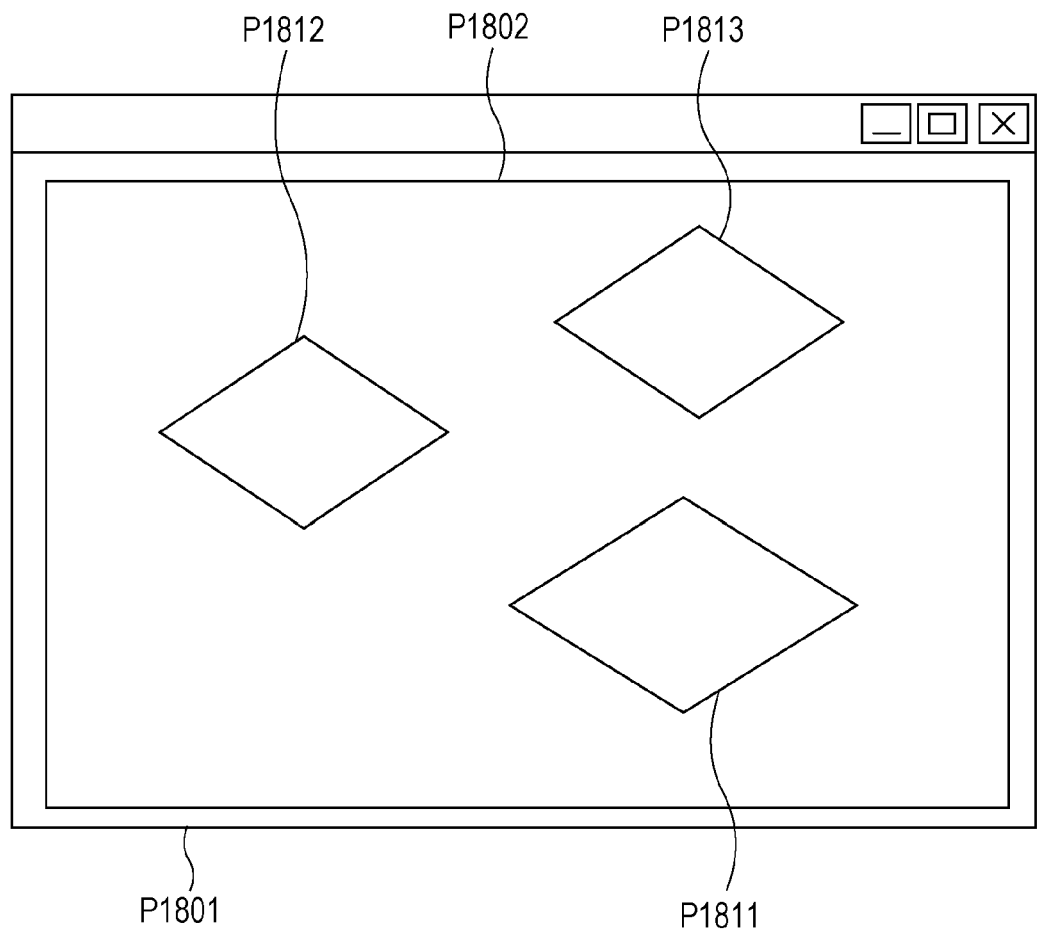
FIGS. 17A and 17B are an example of layout template and setting of a standard image size according to the forth embodiment.
Figure 17B:
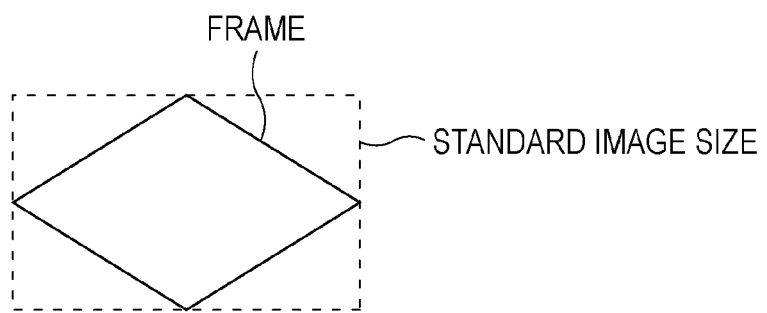

In FIG. 17A, P1801 is a display window, P1802 is a background image. P1811, P1812, and P1813 each are frames to arrange the image. Shown in FIG. 18, P1811, P1812, and P1813 each are not rectangular, but are rhombus shaped.

The image processing method according to the present embodiment is explained as follows, but portions of the explanation similar to the first embodiment are omitted. Except for a decision method that selects either the length or the width as the object of comparison when comparing the object image size with the standard image size in S702, the present embodiment is the same as the first embodiment.

P1811, P1812 and P1813 of the present embodiment are not rectangles, but are rhombuses. Therefore the standard image size which is explained in the first embodiment is circumscribed in a frame of the rhombus as shown in FIG. 18B. That is, in the present embodiment, the standard image size is a rectangle size to be circumscribed in the frame.

In S702, CPU 101 decides selecting either the length or the width when comparing the object image size with the standard image size. The judgment that compares either the length or the width is different from the first embodiment this time.

In the present embodiment, in case that Wo/Ho>Ws/Hs, CPU 101 compares the length, that is Ho and Hs. In case Wo/Ho<Ws/Hs, CPU 101 compares the width, that is Wo and Ws. And in case that Wo/Ho=Ws/Hs, the CPU 101 may compare either the length or the width.

The selection of which of the length or the width when comparing the object image size with the standard image size is reverse to the first embodiment as mentioned above. This means that, of similar figures that the width-to-length ratio (the aspect ratio) of the object image is similar to, the smallest similar figure which does not have a blank in the layout frame is circumscribed in a rectangle of the standard image size.

Figure 18A:
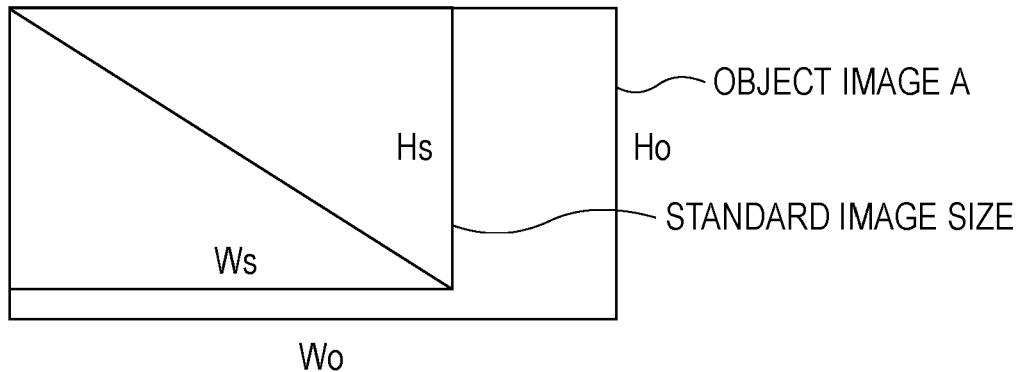
FIGS. 18A and 18B are an explanatory diagram of comparison method of a standard image with an object image according to the fifth embodiment.
Figure 18B:
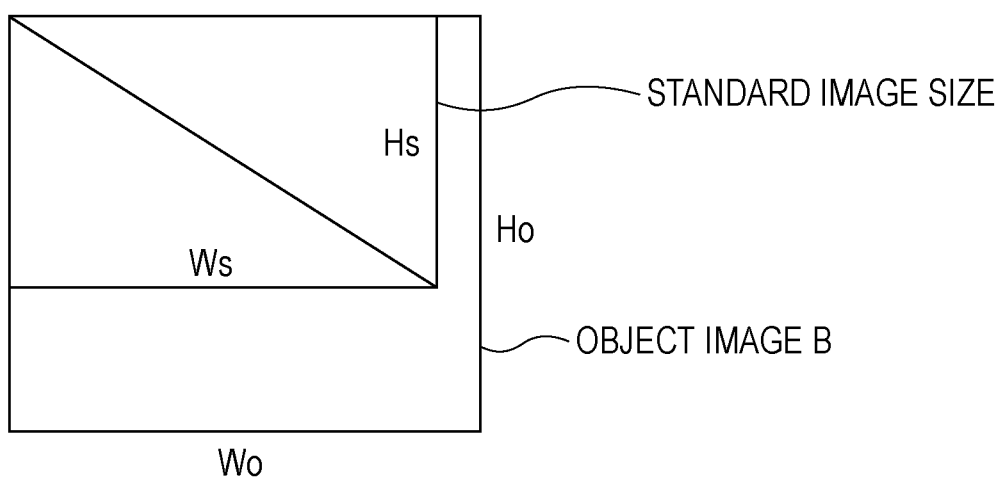

Shown in FIG. 18A, in case that the width to length ratio of the object image (Wo/Ho) is larger than the ratio of the standard image (Ws/Hs) as a result of comparing the width with the length of the object image and the standard image, the lengths may be compared. This means that, of similar figures that the width-to-length ratio of the object image is similar to, the length side of the smallest similar figure which restrains the deterioration in the image quality is circumscribed in the length side of the rectangle of the standard image size.

On the other hand, Shown in FIG. 18B, in case that the width to length ratio of the object image (Wo/Ho) is smaller than the ratio of the standard image (Ws/Hs) as a result of comparing the width with the length of the object image and the standard image, the widths may be compared. This means that, of similar figures that the width-to-length ratio of the object image is similar to, the width side of the smaller similar figure which restrains the deterioration in the image quality is circumscribed in the width side of the rectangle of the standard image size.

After the decision of sides, as the object comparison by this way, CPU 101 determines whether the deterioration in the image quality occurs or not, by comparing the object image with the rectangle of the standard image size. The steps below are the same as the flowchart of the first embodiment, so the explanation thereof is omitted.

In the present embodiment, a case that the image processing apparatus produces an output that makes use of a frame of a template selected by a user is explained. "The output that makes use of a frame of a template selected by a user" means that the output image was as if it was dug out by the frame, by making the image arranged to the template with same as the frame.

In the present embodiment, in case that images are layout and output with size a user sets, if it is determined that deterioration in the image quality occurs, CPU 101 causes to change automatically the image size to an appropriate size.

By this method, the image processing apparatus can generate and output the layout image which restrains generation of the jaggy without changing the image selected by a user, Choice of the images as output results becomes wider, the image processing apparatus can generate and output various kinds of layout images.

Embodiment 5

In the present embodiment, the structure of the image processing apparatus and the flowchart of the initial setting in the image processing method is the same as the first embodiment, so the explanation thereof is omitted.

In the image processing method according to the present embodiment, in case that images selected by a user are layout, at the size set by a user and an image is output, CPU 101 determines whether the deterioration in the image quality occurs or not. In case that it is determined that the deterioration in the image quality occurs, CPU 101 causes to change the size of the whole output data.

First, CPU 101 compares the resolution of the selected object image with the resolution set by a user in the initial setting. In case the resolution of the object image is smaller than the resolution set by a user, it is determined that the deterioration in the image quality occurs, images are output after reducing whole size of the output data. The image processing apparatus reduces the whole size of output data (for example, a size of output paper) and outputs the image so that the image is held in that. The desirable output paper size is similar to the paper size that the user selected.

Then the image processing apparatus sets the standard image size again to the paper size which is set again. In the present embodiment, as shown in FIG. 19, the image processing apparatus sets the standard image size again while keeping the ratio of FIG. 4A In the present embodiment, in case that the resolution of more than one object images is smaller than the set resolution, the above-mentioned processing is performed.

As above mentioned, in case that it is determined that the deterioration in the image quality occurs, the paper size is changed so that a ratio of each image size for paper size that a user selected is kept constant. By this method, the ratio of each image size for paper size that a user selected constant can be kept.

By this method, the image processing apparatus can generate and output the layout image which restrains generation of the jaggy, without changing the image selected by a user, Choices of the images as an output result becomes wider, the image processing apparatus can generate and output various kinds of layout images.

Other Embodiments

The above explanation is used to explain each embodiment of the present invention, but it is to be understood that the basic structures of the present invention are not intended to be limited to the above structures.

In the above embodiment, it is decided the output paper size when generating the layout image, but the present invention is not limited to this. For example, in case that a display device displays the generated layout image, it is decided a display size instead of the paper size and a similar processing is performed.

In the first embodiment, the image processing apparatus selects the standard image size from the image size pattern, but the present invention is not limited to this, a user may set the standard image size. For example, in case that the standard image size is already smallest of the image size patterns available in S704, a user may set a standard image size which is smaller than the image size patterns. Then this method restrains that jaggy occurs more surely.

In the first embodiment, in case that the standard image size of a frame which arranges the object image is the smallest of the image size patterns in S704 and S707, the process proceeds to S709 and the image is enlarged. However the present invention is not limited to this. In this case, the image processing apparatus may indicate on display showing that the degradation in image quality is outstanding, and urge a user to change the image (reselect the image).

In the second embodiment, the selected three object images may be changed to either one of the standard images. But, in case that the object image is smaller than the smallest standard image, the image processing apparatus may indicate on display showing that the degradation in image quality is outstanding, and urge a user to change of the image (reselect the image).

In the forth embodiment, the case of a frame that the image is arranged to is a rhombus shape is explained. But, even if the frame is a figure other than a rhombus shape, the jaggy is restrained by performing the image processing similar to the forth embodiment. Even if the form of the frame is an arbitrary form, the image processing apparatus can perform a similar processing in what the frame is inscribed in the standard image size.

In the above embodiment, it is compared the width-to-length ratio of the standard image size with the width-to-length ratio of the object image, and is decided to compare which of the length side or the width side of the standard image size and the objet image. But the present invention is not limited to this. For example, an output resolution may be compared when adapting the object image to the layout (hereinafter referred to as "Ro") with the output resolution (hereinafter referred to as "Rs"). In this case, an effect which is similar to the above embodiment is provided. That processes is explained as follows.

For example, in case that the resolution Ro as the object image P603 is arranged in a layout template P311 as shown in FIG. 3 is equal to a resolution of output image, that is Ro=Rs, the output image is arranged at a position that a user desires in the layout.

However, in case that a resolution of the object image P603 is larger than the output resolution, that is Ro>Rs, the object image is resized and is arranged. At this time, it is decided either the length or the width as standard and how much to resize the object image, by comparing the width-to-length ratio of the object image and the standard image. In case that Wo/Ho>Ws/Hs, the object image is resized so that the width lengths become same, that is, Wo matches Ws. In case that Wo/Ho<Ws/Hs, the object image is resized so that the length becomes the same, that is, Ho matches Hs. In case that Wo/Ho=Ws/Hs, the object image may be resized based on either the width or the length.

In case that a resolution of the object image P603 is smaller than the output resolution, that is Ro<Rs, CPU 101 calculates a resolution Ro of the object image when changing the size of the object image to a smaller standard image size. The object image is resized so that becomes Ro=Rs or Ro>Rs finally. Here, it is decided either of the length or the width as standard and how much to resize the original image, by comparing the width-to-length ratio of the object image and the standard image. In case that Wo/Ho>Ws/Hs, the object image is resized so that the width become the same.

In case that Wo/Ho<Ws/Hs, it is resized the object image so that the length become the same. In case that Wo/Ho=Ws/Hs, the object image may be resized so that either the widths or the lengths are same.

In the above-mentioned embodiments, the case that jaggy occurs as the degradation in image quality is used to explain, the degradation in image quality is not limited to this. In case that any degradation in image quality occurs, when it is determined that the degradation in image quality occurs, the standard image size which is set to the object image may be changed and the image is changed to the changed standard image and is arranged.

The present invention can provide an apparatus and method that simply and easily output the layout image with restrained deterioration in the image quality.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

It is not necessary to perform all of the above-mentioned processing by software, one may perform one part or all, by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153678, filed Jul. 9, 2012, which is hereby incorporated by reference herein in its entirety.

What is claimed is:

1. An apparatus comprising:
    a determination unit configured to determine whether an object image satisfies a predetermined standard, if the object image is changed to a standard image size predetermined;
    a changing unit configured to change the standard image size predetermined, in a case that the object image does not satisfy a predetermined standard by the determination unit;
    a generation unit configured to change the image to the standard image size predetermined set or the standard image size changed by the changing unit, and to generate the layout image.

2. The apparatus according to claim 1,
wherein the determination unit determines based on a comparison of the size of the object image and the standard image size.

3. The apparatus according to claim 2,
wherein, in a case that the size of object image is smaller than the standard image size, the determination unit determines the object image does not satisfy the predetermined standard, and the changing unit changes the standard image size to a smaller standard image size.

4. The apparatus according to claim 2,
wherein the determination unit determines based on a comparison one of a length of the object image and the standard image and a width of the object image and the standard image.

5. The apparatus according to claim 4,
wherein the determination unit decides whether the length of the object image and the standard image or the width of the object image and the standard image is used to compare based on comparing an aspect ratio of the object image and the aspect ratio of the standard image.

6. The apparatus according to claim 4,
wherein the changing unit changes the standard image size based on the length of the object image and the standard image size or the width of the object image and the standard image size used by the determination unit.

7. The apparatus according to claim 1,
wherein the determination unit determines based on the comparison of a resolution of the object image and a resolution of the output layout image.

8. The apparatus according to claim 1, further comprising:
a setting unit configured to set the standard image size.

9. The apparatus according to claim 1, further comprising:
a decision unit configured to decide a layout placement arranging the object image in the layout image.

10. The apparatus according to claim 9,
wherein the decision unit decides layout placement by using one or more than 1 layout pattern.

11. The apparatus according to claim 1,
wherein the changing unit changes the standard image size set by the object image, in a case multiple layout placement arranging the object images is arranged in the layout image, each layout placement has set standard image size assigned, and the changing unit changes a layout placement of the object image.

12. The apparatus according to claim 1, further comprising:
a size decision unit configured to set a size of the layout image.

13. An apparatus comprising:
a determination unit configured to determine whether an object image satisfy a predetermined standard size, if the object image is arranged to the predetermined standard image size;
a changing unit configured to change a size of the layout image, in a case that the object image does not satisfy a predetermined standard by the determination unit;
a generation unit configure to resize the image to the standard image size predetermined and to generate a layout image.

14. The apparatus according to claim 13,
wherein the determination unit determines based on a comparison of size of the object image and the standard image size.

15. The apparatus according to claim 14,
wherein, in case that the size of object image is smaller than the standard image size, the determination unit determines the object image does not satisfy the predetermined standard, the changing unit changes the layout image size to a smaller layout image size.

16. A method comprising:
determining whether an object image satisfies a predetermined standard image size, if the object image is changed to a standard image size predetermined set;
changing the standard image size set, in a case that the object image does not satisfy a predetermined standard size;
changing the image to the image standard image size predetermined set or the standard image size changed by the standard image size changing and generating a layout image.

17. A non-transitory computer-readable recording medium storing a program for executing the image processing method according to claim 16.

18. A method comprising:
determining whether an object image satisfies a predetermined standard size, if the object image is arranged to a standard image size predetermined set;
changing size of the layout image, in a case that the object image does not satisfy a predetermined standard by the determination;
resizing the image to the standard image size set beforehand and generating a layout image.

19. A non-transitory computer-readable recording medium storing a program for executing the image processing method according to claim 18.

* * * * *